Jan. 18, 1955     D. V. STELLIN     2,699,693
MATRIX AND METHOD OF MAKING SAME
Filed May 11, 1953     2 Sheets-Sheet 1
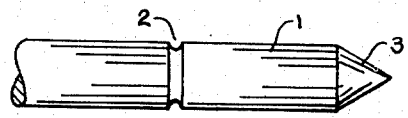
FIG. 1
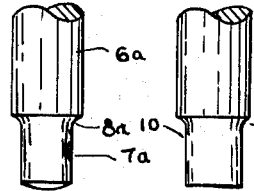
FIG. 2
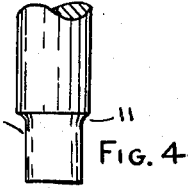
FIG. 4
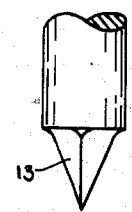
FIG. 6
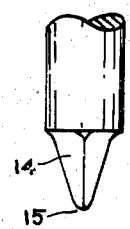
FIG. 8
FIG. 10
FIG. 3     FIG. 5
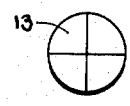
FIG. 7
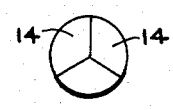
FIG. 9
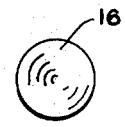
FIG. 11
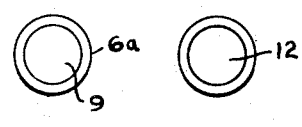
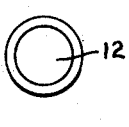
FIG. 19
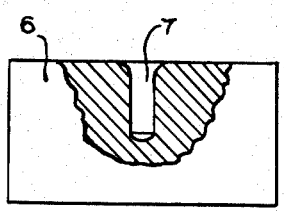
FIG. 18
FIG. 12     FIG. 14     FIG. 16
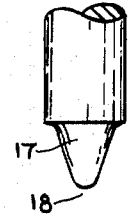
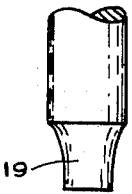
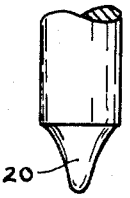
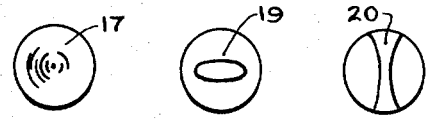
FIG. 13     FIG. 15     FIG. 17
*INVENTOR.*
DOMNIC V. STELLIN
BY
Samuel Wusman
*Attorney*

Jan. 18, 1955  D. V. STELLIN  2,699,693
MATRIX AND METHOD OF MAKING SAME
Filed May 11, 1953

INVENTOR.
Domnic V. Stellin
BY

United States Patent Office 2,699,693
Patented Jan. 18, 1955

2,699,693

MATRIX AND METHOD OF MAKING SAME

Domnic Victor Stellin, Chicago, Ill., assignor to American Screw Company, Willimantic, Conn., a corporation of Rhode Island Application May 11, 1953, Serial No. 354,363

2 Claims. (Cl. 76—107)

The present invention pertains to master dies or matrices and vaned tools made therefrom for use with cold heading machines and the like. This application is a continuation-in-part of my co-pending application, Serial No. 166,899, filed June 8, 1950, issued as Patent No. 2,638,019 of May 12, 1953.

The principal object of the invention is to provide a novel method of producing tools economically, for example, master dies or matrices and tools made from the dies to form recesses and other cavities in screws, bolts, and the like, or tools for driving or adjusting screws, bolts, and the like in high production machines. The invention provides tools of the latter character that will stand up efficiently under the high speeds of modern high speed machinery, which heretofore has been impossible. With existing devices and methods, for example, the tools for producing recesses or other cavities in screws, bolts, and the like either wear out or break before a satisfactory number of pieces have been operated on with one tool, whether it be a punch, die or other tool. The rapid wear or breaking of the tool shows up particularly when used on high production machines, for instance, those working at about 13 thousand strokes per hour.

This invention has shown by actual test that approximately twice the number of pieces can be obtained thereby before the tool wears out or breaks, while at the same time the object produced by such tools will have a longer life as far as the recess, socket or other cavity is concerned. In other words, the object produced by tools made according to the invention will not break, split or wear out as frequently as with existing devices. Furthermore, the chewing, burring or reaming at the recesses or other cavities are eliminated almost entirely, and at the same time a driver for screws, bolts, and the like will have a longer life than those made by existing methods. My method as described herein shows up its advantages particularly in power driving of screws, bolts, and the like.

Another object of my invention is to produce a master die by a novel and economical method which will replace the expensive methods now used. At the present time die sinking is usually used in forming the recess in the master dies from which the tools are made. This method is rather expensive in view of the life of these dies and the price of tools made from the dies. My method of forming the recess, socket or the like in the master die is simple and economical and yet much more effective and will produce tools which are tougher and more durable than those now in use.

A further object of my invention is to eliminate the usual wasteful method of roughing out a tool by tool room practices before it is finished by the master die, for example, milling out portions of the tool before it is pressed in the master die to give it the final form. The conventional method is not only more expensive than my novel method, but it also reduces the toughness in the tool so made. Die sinking is too expensive and slow to warrant its use in modern competition or in case of emergencies such as war. In milling out most of the stock from the tool by the conventional method described, the tool will not be as tough as one made according to my principle. By this principle the metal is compressed more evenly and therefore does not allow some portions to be tougher than others which are thus more susceptible to breakage. The latter defect is noticed particularly after the tools have been heat treated, which is necessary before the tools are ready for use. Therefore, a more durable tool and a more economically produced tool is obtained by my principle, and yet such tools will form a recess or socket which lasts longer and adds to the life of a screw, bolt or the like.

Still another object of the invention is to produce a tool so constructed that it will push the metal and spread it more easily and with less strain on the machine or parts which hold the tools in the machine. A tool made in this manner produces a better recess or other cavity which will not induce splitting, breaking or reaming of the recessed member under the action of a power driven screwdriver. Also, the tip of the tool, whether it be a punch or driver, will be tougher and will last longer in the production or driving of screws, bolts and the like and will not flatten out or lose its shape, such deformations requiring replacement even before the tool breaks. With my principle the metal compresses equally and proportionally in each and every portion of the tool, particularly the corners of a recess, socket, impression or other cavity, and will form such corners without any undue strain on the machine or parts which hold the tool, by the provision on a forming tool which will sink to the proper depth in a recess without damage to the tool, tool holder or the machine itself and hence without loosening of the gibs or the like.

Another object of the invention is to provide on the tool a bullet nose or a shape which resembles a cone, or a spherical shape on the tool to prevent the heating of the tool tip, which causes annealing of the constant hammering of the tool while forming recesses or other cavities when the tool is operated by a high speed cold heading machine or the like. Such heating of the tip results in softening of the tool, whereby its life is reduced and the tool is made ineffective. The bullet nose or cone shaped tool, or spherically shaped nose, not only gives a longer life to the tool, but the article produced with such a tool is tougher, and more durable; and screwdrivers produced according to the invention also last longer than existing devices. Furthermore, the sharp cornered tools or sharp cornered recesses produced by such tools, by conventional means, contribute to the breaking of the tools or objects obtained from the tools. In other words, the flat shapes or sharp cornered tools are entirely eliminated by my invention.

Another object of the invention is to provide a matrix which will produce a larger number of parts without losing dimensions or breaking.

A further object is to provide a matrix for making recesses, sockets, impressions and the like whose walls of the cavity are toughened by extra compression resulting from reversing the flow of metal after a hub has reached the bottom of the cavity and has already compressed the walls on its way to the bottom.

A still further object is to eliminate the usual vent hole in the matrix stock, so that when a blank is pressed in the matrix the extra stock from the blank is reversed toward the top of the matrix, thereby producing a secondary compression of the blank in forming screwdriver bits and the like, of longer than ordinary life, as fully described in the aforementioned patent.

The invention is fully disclosed by way of example in the following description and in the accompanying drawings in which:

Figure 1 is an elevation of a blank for a recess forming punch;

Figures 2 and 3 are an elevation and an end view respectively of a pre-forming or toughening punch;

Figures 4 and 5 are an elevation and an end view of a modified form of toughening punch;

Figures 6 and 7 are an elevation and an end view of another modification;

Figures 8 and 9 are an elevation and an end view of another modification;

Figures 10 and 11 are an elevation and end view of another modification;

Figures 12 and 13 are an elevation and end view of another modification;

Figures 14 and 15 are an elevation and end view of another modification;

Figures 16 and 17 are an elevation and end view of another modification;

Figure 18 is an elevation, partly in section, of a master die block having a preliminary hole drilled therein;

Figure 19 is a similar view of a modification having a center punch hole;

Reference to these views will now to made by use of like characters which are employed to designate corresponding parts throughout.

According to my method I first machine blanks of the character shown in Figure 1. Here a blank 1 is being cut from a bar in a high speed automatic screw machine or other efficient machine, but not by the usual tool room methods which are slow and expensive. The cutting occurs at the groove 2. The bar is preferably annealed at the steel mill before it is machined in order to enable it to be more easily handled during the forming of the tool to the shape of the desired recess, socket or other cavity. The automatic screw machine or other fast machine will first shape the blank in a preliminary form. For example, if the ultimate tool is to be used on a screw or bolt with a cross-recess having converging end walls, the blank will be formed with a conical end 3 having the same angle as the convergence of the socket head walls. Next, the pointed end of the blank is pressed in the master die of Figures 22 or 25–28, as will hereinafter be described, by means of a hydraulic press until the blank reaches the bottom of the die cavity, which completely forms the working end of the tool.

Figure 20:
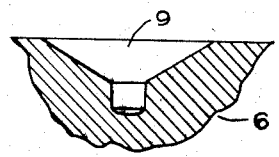
Figure 20 is a similar view of still another modification having a center drill hole.

The block 6 in which a matrix or recess is to be formed, to produce the master die, (Figures 18, 19 and 20) is formed preliminarily at the center of the proposed cavity with a small drilled hole 7, a punched hole 8 or a flared drill hole 9 as in Figure 20. The recess thus formed must be smaller in all dimensions than the punch or punches to be subsequently inserted, as will presently be described.

The pre-forming or toughening punch for various types of master dies is made in various forms as shown in Figures 2 to 17. In all cases it is made from bar stock 6a. In Figures 2 and 3 the working end is a reduced cylinder 7a with a chamfer 8a between the body of the cylinder and a flat point 9 at the free end of the cylinder. In Figures 4 and 5 is shown a similar reduced cylinder 10 with the chamfer 11 and a flat free end 12.

In Figures 6 and 7 the working end is a four-sided pyramid 13. In all cases there is an outward chamfer between the working end and the body and, although shown throughout, need not be mentioned hereafter. In Figures 8 and 9 the working end is a three-sided pyramid 14 with the apex rounded at 15.

In Figures 10 and 11 the working end is a cone 16. A somewhat similar cone 17 in Figures 12 and 13 has its apex rounded at 18, and it is generally preferred to round off a sharp point.

In Figures 14 and 15 the working end 19 is of oval cross section at the end tip, widening out toward the body. In Figures 16 and 17 the working end 20 is of double concave cross section, also widening out toward the body.

The selected pre-forming or toughening punch is driven into the recess 7, 8 or 9 previously formed in the block 6. It will be noted that the block is not vented, contrary to usual practice. The working end of the punch will impart its shape in forming a recess in the block. The initial action of the punch is to compress metal into the walls of the recess thus formed. Since there is no vent for the escape of the surplus metal, the surplus that remains after compression flows in a reverse direction or upward to the top of the cavity, accumulating on the top of the block and obviously around the edge of the cavity.

The hole 7, 8 or 9 prevents splitting of the block 6 and damage to the applied punch. This hole, being slightly smaller in all dimensions than the hole formed by the punch and smaller than the final die cavity, assures proper cleaning or finishing of the parts of the cavity tangent to the inscribed circle. If these parts are not properly finished, all punches made from the master die will still have a groove which will form too large a recess in the screw, bolt or the like shaped by the punches.

A master punch or hub 21 (Figure 21) is machined from a hard metal and corresponds to the shape of the cavity to be formed in the die. In this instance the punch has a series of vanes 22 to form slots 23 in the shape of the cavity shown in Figure 22. The lateral or outer edges 24 of the vanes lie in a conical surface to form the outer converging walls 25 of the slots 23. The tip 26 of the hub is ground off or bullet nosed as previously stated.

It is of extreme importance that the master punch be finished smooth and every tool mark removed from it before it is pressed in the master die stock. This will insure against breakage of the master die when it is used to form tools for the production of recesses in screws and the like. A mirror finish could be given the punch by using an emery cloth, or better still, by liquid honing which is done after heat treating, at a very nominal cost of a few cents per punch. This will prolong the life of the punch as well as the master die and will also impart a smooth finish on the tools made in the die and to the recesses made by such tool. A smooth finish, moreover, prevents breakage of steel.

The hub 21 is forced under hydraulic pressure at least to the bottom of the hole previously formed in the block 6 by one of the toughening punches. The cavity is thereby completed, leaving excess metal 37 that has been forced out of the cavity. The excess metal is shown exaggerated in Figure 22 for clearness. On removal of this metal the die is ready for hardening and use.

It will be noted that, since the block 6 has no vent, the excess metal has been forced to flow reversely or upward. The hub, on entering, enlarges the cavity and compresses the metal laterally, thereby hardening the walls of the cavity. On further movement of the hub the upward or reverse flow of metal commences, and this movement further hardens the walls of the cavity as in the operation of the toughening punch previously described.

In some cases the hub may be used directly, without the preliminary use of a toughening punch. In such cases the guide hole 7, 8 or 9 guides the hub when applied under hydraulic pressure. In addition, the guide hole relieves the pressure and preserves the hub, preventing it from breaking while being pressed into the block 6.

I have found during experiments that a small cavity to be formed in the master die block requires no drill hole to lead the hub. In such case the pre-forming punch is applied to the block 6 without the aid of a drill hole. Instead of the drill hole, a center-punch hole is formed. I have also found that, in the case of a small cavity, the pre-forming punch may be entirely eliminated. It is only necessary to form a center punch mark 8 as in Figure 19 and cause the hub to follow this mark until it reaches the desired depth, according to the size of the cavity required in the master die. After this operation and removal of excess metal, the master die is ready for hardening in the usual manner.

Figure 25:
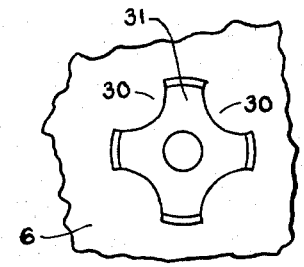
Figures 25 and 26 are plan views of dies of different forms made by correspondingly shaped finishing punches.
Figure 26:
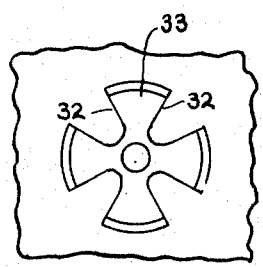

Various shapes of the die cavities are shown in Figures 25 to 28. In Figure 25 is shown a cavity of the cruciform type in the block 6, with the side walls 30 of radial slots 31 converging radially outward, so that the slots are wider near the axis of the cavity. A reversed condition is shown in the cruciform cavity of Figure 7. Here the side walls 32 of each slot 33 diverge radially outward, so that the slots are narrower near the axis of the cavity.

Figure 28:
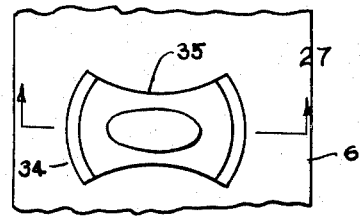
Figure 28 is a plan view of the cavity of Figure 27.
Figure 27:
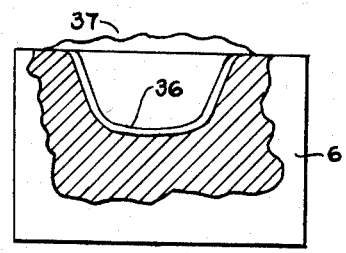
Figure 27 is a cross section of another die or matrix formed with a differently shaped finishing punch, showing the expelled metal at the surface.

Figures 27 and 28 illustrate a cavity of the clutch type having two concave end walls 34 joined by two convex side walls 35. The walls 35 have their minimum spacing from each other near the axis of the cavity. Thus, they converge from both end walls 34 toward the axis.

Figure 22:
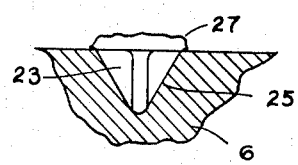
Figure 22 is a cross section of a master die or matrix, showing the expelled metal at the surface.
Figure 21:
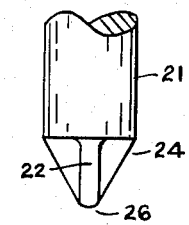
Figure 21 is an elevation of a finishing punch for the matrix.

It will be understood that the cavities shown in Figures 25 to 28 are formed with correspondingly shaped hubs in the manner described in connection with Figures 21 and 22. The bottom of the cavity 34, 35 is slightly concave as indicated by the numeral 36 in Figure 27. Other concave bottoms and other forms of cavities are shown in my U. S. Patents Nos. 2,397,216; 2,445,978 and 2,556,155. Various other shapes of cavities may be formed according to the invention, by the use of correspondingly shaped hubs. Figure 27 also shows the excess metal 37 that is forced by the hub to the top of the block and ultimately removed as previously described. In all the illustrated forms of cavities it will be seen that the end walls are concave, the extremities of these walls being nearer the axis of the cavity than are the midpoints.

A different operation may be used in forming small cavities. The guide hole need not be provided, but instead a punch with a rounded tip as in Figure 12 may be used as the only operation prior to applying the hub. However, this method is optional, and the more complete method may be used if more desirable.

The master die, having been completed as described, is ready for the production of punches or other tools for forming cavities in screw heads and similar products. The pointed bar stock 1 is forced into the master die shown in Figure 22, for example, under sufficient pressure to force the metal to fill the die cavity. Consequently, the stock takes the shape shown in Figure 23, with vanes 40 corresponding to the slots or recesses 23 of the die cavity. The excess metal forced out of the die cavity forms a collar 41 at the usual shoulder 42.

Figure 23:
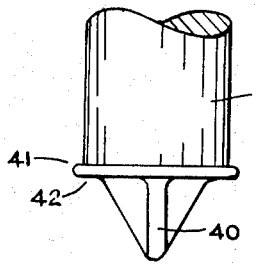
Figure 23 is an elevation of a punch formed in a die.

The collar 41 is now cut off and, if necessary, the diameter of the shank is reduced preparatory to hardening. However, if desired, a small quantity of excess stock may be left on the shank for final grinding after hardening. Centerless grinding is recommended for fast and economical mass production. The punch shown in Figure 23 is made in a master die produced by the master punch 21 of Figure 21 which has the edges of its vanes lying in a conical surface.

Figure 24:
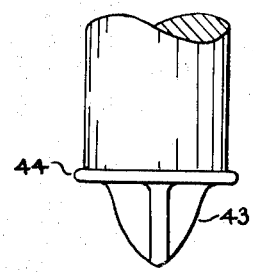
Figure 24 is an elevation of a different punch so made.

A modified punch shown in Figure 24 has convex edges 43 on the vanes. The collar 44 of excess metal is finally trimmed, as previously described.

Existing methods of making punches and dies and similar tools involve end milling to shape the driving vanes of a driver or the slots or grooves of a die. An end mill is a delicate tool when used for a small punch such as the average punch for forming sockets in screw heads. Further, end milling is a slow and expensive procedure of roughing out an object such as a recess punch or similar tool. The invention described herein eliminates all end milling.

The existing methods of grooving or end milling a punch leave little metal to compress. By eliminating the end milling or grooving and instead pressing the blank of Figure 1 into the master die there is a thorough compression of metal into the grooves or slots of the die. The surface of each punch, corresponding to the side walls and end walls of each groove in the die, are combined and toughened by compression in changing the stock from its original cone shape to the cross or other shape of the die. As a result, a punch so produced has at least double the life of a punch made by existing methods. This has been shown by actual tests.

I have also found by experiment and tests that the matrix of the die is not harmed by pressing a cone shaped piece of stock into it. I have come to the conclusion that, in conventional methods, the strength of a punch is considerably reduced when the stock is machine grooved before being pressed into a matrix or die. The life of a punch so produced is so short, for example in the case of a cruciform punch, that the entire operation is very costly, when one considers the initial price of the punch, the frequency of replacement, the large numbers that must be used, and the low prices charged for screws or similar products made with the punches in a competitive market.

Figure 29:
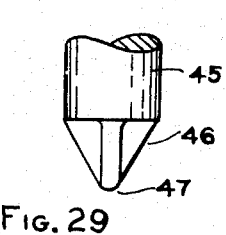
Figure 29 is an elevation of another form of pre-forming punch.

In Figure 29 is shown a pre-forming punch 45 which, instead of being conical as in Figure 10, is formed with vanes 46. This punch is smaller in all respects than the hub. The shank is of less diameter, the vanes are thinner, the conical end has a shorter altitude and a smaller apex angle, and the apex itself is rounded at 47 on a much smaller radius. As to the apex angle, if it is to be 60 degrees in the hub and master die, it would be about 58 degrees in the pre-forming punch 45—47, or in any case, a difference of about 2 degrees. The smaller dimensions of this punch and the corresponding roughening punch insure sufficient stock for final finishing of the various walls and other surfaces in the master die shown in Figure 22. Also, the radii between successive slots in this punch will be smaller, for the same purpose.

The matrix or master die is also produced by the described method of compression of metal rather than by the expensive methods now employed, such as machining or die sinking. No harm is done to either the hub or master die in this compression method but, on the contrary, both the hub and the die are considerably strengthened.

I have illustrated and described punches and dies for forming the so-called equidistant walls in socket head screws as described in my Patent No. 2,445,978, of July 27, 1948. However, the invention is not limited to tools for sockets of this character and is applicable to tools for forming various shapes of recesses, sockets and other cavities. In the claims the word "tool" designates a punch, die or other form of tool unless otherwise indicated.

Figure 30:
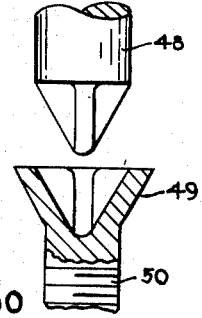
Figure 30 is an elevation, partly in section, showing a driver in conjunction with a screw.

The die, after hardening, is also used for making drivers for socket head screws. Such a driver has the same shape as the master hub, according to the shape of the die. A driver is designated by the numeral 48 in Figure 30 and is shaped to fit into the socket head 49 of a screw 50 in the manner known in the art or as shown in my prior patents mentioned above.

In drilling the guide hole in the blank, care must be taken not to make it too deep. In fact, enough stock must be left to enable the hub to provide the necessary metal required for the extra compression, which is an important object of the invention.

In order to make certain that the excess metal is caused to flow reversely or upward by operation of the hub, as described, it may be necessary to punch the drilled hole by punches as shown in Figures 2 and 4. Such punching of the drilled hole will toughen the bottom of the hole so that the metal is better reversed toward the top of the blank. It will be understood that, even after the hole is punched, enough stock is left for final finishing of the cavity by means of the hub. By punching the drilled hole, additional toughening of the walls around the recess and at the bottom is accomplished, resulting in double extra compression at the walls by means of the hub as it is forced into the hole.

By eliminating the customary number of operations in forming the cavity, more metal is retained to provide compression in the described reversal of the flow of metal toward the top after the hub has reached the bottom of the recess. Such additional compression on the reversed flow results in tougher surfaces of the cavity, which in turn enables the production of a larger number of pieces from the die or matrix before it begins to lose dimensions or break. This is important inasmuch as dies are replaced quite often on account of the large numbers of pieces used in a factory and which are usually produced from the same die for standard dimensions. It may be noted that in the screw industry the recess must correspond with the dimensions of the driver bits, so that the bit properly fits the recess in the screw in order to enable a screw to hang on the driver bit. The hanging-on feature is important inasmuch as it permits the operator on production lines to manipulate without difficulty, particularly in unhandy places, or where the operator must guide a portable tool which molds the driver bit.

Another important characteristics of the invention is that the die or matrix is fabricated with no heating or annealing of the blank. Other features of the described method are an even distribution of flow of the displaced metal; relieving the pressure on the hub, thereby avoiding breaking the latter; relieving the pressure of the hub on the matrix blank, thereby preventing breaking of the blank; and enabling the use of the smallest possible blank, thereby economizing in material.

Blanks shaped as in Figures 6–12 may be pressed into matrices to form tools such as punches, screw drivers, driver bits or gages. For example, a blank in the form shown in Figure 12, with a round-pointed conical end and a shoulder, may be pressed into a matrix to form tools for cruciform recesses in screw heads.

Although specific forms and uses of the invention have been disclosed, it will be understood that the invention is not limited thereto. For example, the vanes and corresponding recesses may have a different curvature than shown or may be less or greater in number with a corresponding number of slots between them, according to the size and shape of the screw head socket for which the punches, dies and drivers are being made. Again, the end of the tool shank, from which the vanes extend, although shown as a flat surface, may take a different form such as, for example, a corrugated surface.

What I claim is:

1. The method of making a die consisting in forming an impression in a block of unhardened metal characterized by the absence of a vent, forcing to the bottom of the impression in said block, while cold, and under high pressure, while maintaining the original unimpressed outer surfaces of said block, a hardened hub of greater volume than said impression and having a shape complementary to that of the die cavity to be formed, whereby metal is initially compressed against the side walls of the cavity and surplus metal is caused to flow to the mouth of the cavity in the reverse direction of the inward movement of the hub, thereby further hardening said walls, withdrawing said hub, and hardening said block.

2. The method of making a die consisting in forming an impression in a block of unhardened metal characterized by the absence of a vent, forcing into said block, while cold, at said impression and under high pressure a hardened punch of larger dimensions than said hole and of smaller dimensions than the cavity to be formed, withdrawing said punch, forcing to the bottom of the cavity in said block, while cold, and under high pressure, while maintaining the original unimpressed surfaces of said block, a hardened hub of greater volume than said cavity and having a shape complementary to that of the die cavity to be formed, the punch and hub being of such dimensions that, on initial insertion thereof, metal is compressed against the side walls of the cavity and the surplus metal is caused to flow to the mouth of the cavity in the reverse direction of insertion, thereby further hardening said walls, withdrawing said die and hardening said block.

References Cited in the file of this patent

UNITED STATES PATENTS

| Number | Name | Date |
|---|---|---|
| 628,687 | Bradley | July 11, 1899 |
| 1,153,965 | Singewald | Sept. 21, 1915 |
| 1,642,696 | Rateike | Sept. 20, 1927 |
| 1,933,355 | Wadsten | Oct. 31, 1933 |
| 2,014,698 | Reilly | Sept. 17, 1935 |
| 2,024,650 | Luce | Dec. 17, 1935 |
| 2,066,372 | Tomalis | Jan. 5, 1937 |
| 2,133,467 | Purtell | Oct. 18, 1938 |
| 2,140,775 | Talbot-Crosbie et al. | Dec. 20, 1938 |
| 2,325,989 | Tryon | Aug. 3, 1943 |